July 28, 1942.　　　O. LALONDE　　　2,291,552
RULER
Filed Feb. 19, 1942
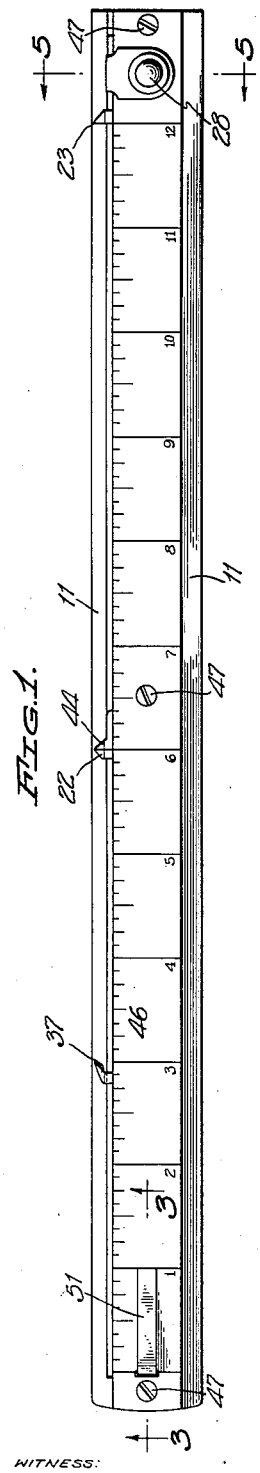
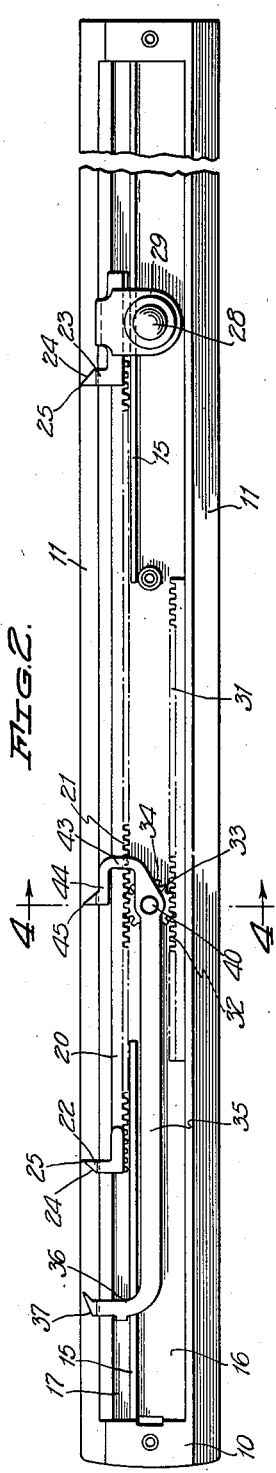
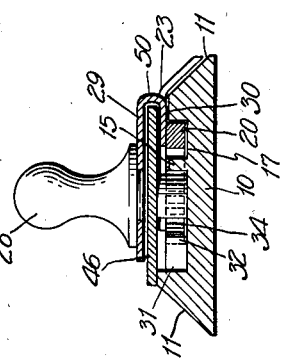
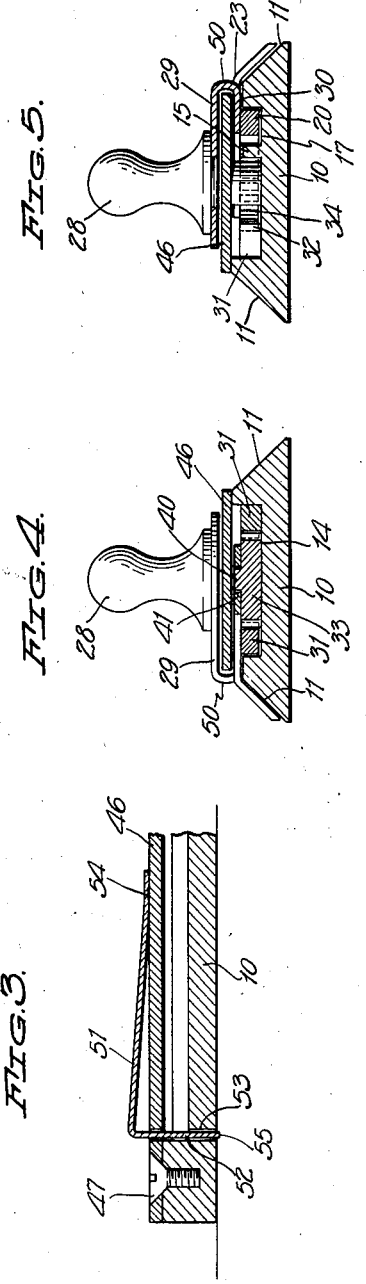
INVENTOR.
OSCAR LALONDE.
BY Ely Pattison.
ATTORNEYS.

Patented July 28, 1942

2,291,552

UNITED STATES PATENT OFFICE 2,291,552

RULER

Oscar Lalonde, New York, N. Y., assignor of one-half to Milton Aronauer, New York, N. Y.

Application February 19, 1942, Serial No. 431,481

4 Claims. (Cl. 33—107)

The present invention relates generally to measuring instruments and more particularly it pertains to an instrument whereby the exact center between two given points may be accurately determined.

It is one object of the invention to provide a novel device of the aforementioned character, the use of which will eliminate the necessity of mathematical calculations in order to determine definitely the center point of any linear measurement.

It is a further object of the invention to provide such a device which is simple in construction and which requires no particular skill or knowledge to successfully operate the same.

In the present illustration of the invention, it is embodied in a twelve inch rule, but it is to be understood that it is not to be so limited and that it may be embodied in devices of larger linear dimensions if desired.

With the above and other objects in view, the nature of which will become apparent, reference will be had to the accompanying drawing and the following specification and claims.

In the drawing:

Figure 1 is a top plan view illustrating a twelve inch rule embodying the present invention, Figure 2 is a view similar to Figure 1 on a slightly enlarged scale illustrating the cover plate of the device removed, Figure 3 is a fragmentary longitudinal sectional view taken substantially on the line 3—3 of Figure 1, Figure 4 is a transverse sectional view taken substantially on the line 4—4 of Figure 2, the view being taken on an enlarged scale and, Figure 5 is a detailed sectional view on an enlarged scale taken substantially on the line 5—5 of Figure 1.

The device consists of a base member 10, the side edges of which are preferably beveled as at 11; and this base member in the present embodiment of the invention consists of a rule bearing the standard calibrations of a twelve inch linear measurement. It will be noted that the base member is slightly longer than the calibrations upon the rule. The purpose of which added length will be obvious as the nature of the invention is better understood.

The top face of the base member is recessed as indicated by the reference numeral 14, and extending longitudinally of this recess, there is a partition or guide wall 15. This construction divides the recess 14 into two longitudinal extending channels 16 and 17 which are separated by the partition or guide wall 15 as best illustrated in Figures 2 and 5. As best illustrated in Figure 5, the height of the partition or guide wall 15 is less than the depth of the channel 14, and the purpose of which construction will be hereinafter more specifically set forth.

The reference numeral 20 designates a rack member which is slidably mounted in the channel 17, see Figure 2. The rack member has a plurality of rack teeth 21 upon its inner edge and at its ends, it carries two indicating fingers 22 and 23. These indicating fingers are fixed to the rack member 20 and are therefore fixed with relation to each other, the space between them being constant, and by reference to Figure 1, it will be noted that this distance between the indicating fingers 22 and 23 when the invention is embodied in a twelve inch rule, is six inches or one half the length of the calibrations upon such a rule. Each of these fingers has a beveled edge 24 which provides a fine point 25, which travels over or coincides with the calibrations upon one of the beveled faces 11 of the base member 10 as illustrated in the drawing.

The rack member 20 is capable of movement longitudinally of the base member in the channel 17, and for operation thereof a hand grip or knob 28 is provided. The hand grip or knob 28 may be carried by a sheet metal member 29, see Figure 5, which has a portion that is U-shaped in cross section, the under portion 30 of which is rigidly secured to the rack member 20.

Mounted in the channel 16 with its teeth in opposed relation to the rack member 20, there is a rack member 31, having teeth 32. This rack member is fixed with relation to the base member and therefore immovable relatively thereto. Interposed between the rack member 20 and 31, there is a gear 33, the teeth 34 of which mesh with both rack members as best illustrated in Figure 2.

The gear 33 carries a bar or the like 35 which overlies the channel 16 and has an angular end extension 36 which projects across the partition or guide wall 15 and the channel 17, the extension of which is provided with a fine point 37 which overlies the calibrations heretofore mentioned upon the beveled face 11. This angular extension 36 constitutes an indicating finger, and it is positioned between the indicating finger 22 heretofore described and the left hand end of the base member 10. The bar 35 may be mounted upon the gear 33 by means of a circular stub shaft projection 40 extending from the upper face of the gear 33 which is received in a circular opening 41 in the bar 35 near the right hand end thereof.

Upon its right hand end, the bar 35 has a substantially right angular extension 43 from which projects an extension 44 which is substantially parallel to the body portion of the bar 35. Projecting from the extension 44, there is an indicating finger 45 which bears a fixed spaced relation to the indicating finger 37 of the bar 35 and which is positioned between the indicating fingers 22 and 23 of the rack member 20. The extension 43 of the bar 35 also overlies the partition or guide wall 15 and the channel 17 with the indicating finger 45 thereof, traveling over the calibrations upon the beveled face 11 heretoforementioned.

By this construction, it will be apparent that upon movement of the rack member 20 in either direction longitudinally of the base member 10, the gear 34 will be rotated and upon rotation, it will travel upon the rack 31 as a track. The ratio between the teeth 34 of the gear 33 and the teeth of the racks 29 and 31 is such that as the rack member is reciprocated, the bar 35 will travel at a linear rate of speed relative to the base member 10 which will equal one half of the linear rate of speed at which the rack member 20 is moved relative to the base member 10.

By this construction and arrangement of parts, it is obvious that the indicating fingers 36 and 45 of the bar 35 will travel only one half as fast relative to the base member as will the indicating fingers 22 and 23 of the rack member 20.

The reference numeral 46 designates a cover plate which fits upon the top of the base member and which is preferably removably secured and that by means of screws 47, as best illustrated in Figures 4 and 5 of the drawing, the U-shaped portion of the member 29 upon which the manipulating member 28 of the rack 20 is mounted, passes around one edge of this cover plate 46 as indicated by the reference numeral 50 in said figures.

In Figure 3 of the drawing, there is illustrated a means by which the base member 10 may be held against accidental displacement relative to a surface upon which the instrument may be employed. This device includes a resilient member 51 having an angular extension 52 which extends through an opening 53 in the base member 10. This member 51 may be attached by spot welding or as otherwise preferred as at 54 to the cover plate 46 and the free end 55 of the angular extension 52 thereof as adapted to be moved into engagement with a table, desk, or other similar support by means of application of pressure upon the body portion of the member 51.

By this construction, it will be obvious that engagement of the free end 55 of the member 51 with a suitable supporting surface will prevent accidental displacement of the base member 10 relative to said surface.

Having thus described the invention, an example of its manner of use will now be set forth.

If the rack member 20 be moved to the extreme right position in the drawing, in which position it is illustrated in Figure 1, it will be noted that the indicating fingers 22 and 44 will be in contact with each other at the six inch station of the rule, the indicating finger 23 being positioned at the twelve inch station of the rule with the indicating finger 37 located at the three inch station of the rule. Thus the indicating fingers 22 and 44 indicate the exact center point of the twelve inch dimension with the indicating finger 37 indicating the center point between the zero and the six inch stations of the rule.

If, for example, it would be desirable to obtain the exact center between the side edges of an element which is eleven and three-sixteenths inches wide, the rack member 20 would be moved to the left until the indicating finger 23 thereof coincided with the calibration indicating the eleven and three-sixteenth inch station upon the rule.

This action would necessitate a movement of the rack member 20 towards the left, would rotate the gear 34 upon the rack 31 and move the indicating finger 45 of the bar 35 to the calibrations indicating the five and nineteen-thirty-second inch station upon the rule, which is one half of the full dimension of eleven and three-sixteenth inches.

If it is desired to find the center position between two points, the distance between which is less than six inches, for example five inches, the same operation is performed moving the indicating finger 22 of the rack member 20 to the calibration indicating the five inch station upon the rule, during which movement the gear 34 in its movement upon the rack 31 will move the indicating finger 37 of the bar 35 to the calibration indicating the two and one half inch station upon the rule.

From the foregoing, and particularly the first example given, it is obvious that by means of the instrument half way points between two dimensions which ordinarily would require mathematical calculation to determine, may be immediately found without necessity of any mathematical calculations, both in an accurate and positive manner. It will be obvious therefore, that the instrument herein illustrated not only saves the time incidental to mathematical calculations for arriving at the desired results, but also removes entirely the possibility of error in such mathematical calculations, thus giving the positive dimension in each result with the least effort.

While the invention has been herein disclosed in its preferred form, it is to be understood that it is not to be limited to the specific detail of construction herein illustrated and that it may be practiced in such other forms as rightfully fall within the scope of the appended claims.

Having thus described the invention, what I claim to be new is:

1. An instrument of the character described comprising a base member having a predetermined calibrated linear dimension, a pair of indicating fingers movable relatively to the base member and said calibrations and having a fixed spaced relation to each other equal to one half the calibrated linear dimension of the base member, means for moving said indicating fingers relative to the base member, a second pair of indicating fingers movable relatively to the base member simultaneously with and upon movement of the first mentioned indicating fingers, said second mentioned indicating fingers having a fixed spaced relation to each other equal to one fourth of the calibrated linear dimension of the base member, said second mentioned indicating fingers being mounted upon the base member with one of them interposed with respect to the first mentioned indicating fingers, and means for effecting movement of the second mentioned indicating fingers relatively to the base member upon movement of the first mentioned indicating fingers at a linear speed equal to one half of that of the first mentioned indicating fingers.

2. An instrument of the character described comprising a base member having a predetermined calibrated linear dimension, a pair of indicating fingers movable relatively to the base member and said calibrations and having a fixed spaced relation to each other equal to one half the calibrated linear dimension of the base member, means for moving said indicating fingers relative to the base member, a second pair of indicating fingers movable relatively to the base member simultaneously with and upon movement of the first mentioned indicating fingers, said second mentioned indicating fingers having a fixed spaced relation to each other equal to one fourth of the calibrated linear dimension of the base member, said second mentioned indicating fingers being mounted upon the base member with one of them interposed with respect to the first mentioned indicating fingers, and means for effecting movement of the second mentioned indicating fingers relatively to the base member upon movement of the first mentioned indicating fingers at a linear speed equal to one half of that of the first mentioned indicating fingers, said means including a rack carried by the first mentioned indicating fingers and movable therewith, a stationary rack carried by the base member, and a gear rotatably carried by the second mentioned indicating fingers and mounted between said racks with its teeth in operative engagement with the teeth of each rack.

3. An instrument of the character described comprising a base member, a rack member slidably mounted on the base member, means for sliding the rack member upon the base member, a plurality of indicating fingers carried by said rack member in fixed spaced relation to each other, a fixed rack member carried by the base member in opposed spaced relation to said sliding rack member, a gear interposed between said rack members with its teeth operatively engaging the teeth of both rack members whereby the gear will move along the stationary rack member at a speed relatively to the base member equal to one half the speed of the slidably mounted rack member relatively to the base member upon movement of the sliding rack member, and a plurality of indicating fingers carried by said gear, one of which indicating fingers is interposed between the indicating fingers of the sliding rack member.

4. An instrument of the type described comprising a base member having a predetermined calibrated linear dimension, said base member being recessed in its upper face, a pair of indicating fingers having fixed spaced relation to each other slidably mounted in the recess of the base member, a second pair of indicating fingers having fixed spaced relation to each other slidably mounted in the recess of the base member in spaced relation to the first mentioned indicating fingers, means including a cover plate for the recess in the base member for guiding the indicating fingers in their sliding movements relatively to the base member, a rack carried by the first mentioned indicating fingers, said rack being movable therewith, a rack immovably carried by the second mentioned indicating fingers and meshing at diametrically opposite points with said racks whereby said second mentioned indicating fingers will be moved simultaneously with the first mentioned indicating fingers as they are moved, and means for moving the first mentioned indicating fingers.

OSCAR LALONDE.